United States Patent
Okamoto et al.

(10) Patent No.: US 10,882,676 B2
(45) Date of Patent: Jan. 5, 2021

(54) PAPER BARRIER MATERIAL

(71) Applicant: NIPPON PAPER INDUSTRIES CO., LTD., Tokyo (JP)

(72) Inventors: Masashi Okamoto, Tokyo (JP); Yuri Oishi, Tokyo (JP); Masatsugu Kato, Tokyo (JP); Masaaki Fukunaga, Tokyo (JP); Akio Miyajima, Tokyo (JP); Hiroshi Koyamoto, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 135 days.

(21) Appl. No.: 16/308,778

(22) PCT Filed: Sep. 29, 2017

(86) PCT No.: PCT/JP2017/035408
§ 371 (c)(1),
(2) Date: Dec. 10, 2018

(87) PCT Pub. No.: WO2018/062466
PCT Pub. Date: Apr. 5, 2018

(65) Prior Publication Data
US 2019/0308786 A1    Oct. 10, 2019

(30) Foreign Application Priority Data

Sep. 30, 2016  (JP) ................ 2016-193098
Oct. 3, 2016   (JP) ................ 2016-196035

(51) Int. Cl.
| | | |
|---|---|---|
| B65D 65/40 | (2006.01) | |
| D21H 19/24 | (2006.01) | |
| D21H 19/82 | (2006.01) | |
| D21H 21/16 | (2006.01) | |
| B32B 27/00 | (2006.01) | |
| B32B 27/10 | (2006.01) | |
| B32B 27/30 | (2006.01) | |
| B32B 27/36 | (2006.01) | |
| B32B 29/00 | (2006.01) | |

(52) U.S. Cl.
CPC ............ *B65D 65/40* (2013.01); *B32B 27/00* (2013.01); *D21H 19/24* (2013.01); *D21H 19/824* (2013.01); *D21H 21/16* (2013.01); *B32B 27/10* (2013.01); *B32B 27/306* (2013.01); *B32B 27/36* (2013.01); *B32B 29/00* (2013.01); *B32B 2255/26* (2013.01); *B32B 2307/7244* (2013.01); *B32B 2307/7246* (2013.01); *B32B 2439/70* (2013.01); *Y02W 90/10* (2015.05)

(58) Field of Classification Search
CPC ...... B65D 65/40; D21H 19/24; D21H 19/824; D21H 21/18; B32B 27/00; B32B 27/10; B32B 27/306; B32B 27/36; B32B 29/00; B32B 2255/26; B32B 2307/7244; B32B 2307/7246; B32B 2439/70; Y02W 90/13
See application file for complete search history.

(56) References Cited

FOREIGN PATENT DOCUMENTS

| | | |
|---|---|---|
| EP | 2199077 A1 | 6/2010 |
| EP | 2777934 A1 | 9/2014 |
| JP | 2003094574 A | 4/2003 |
| JP | 2004042959 A | 2/2004 |
| JP | 2005162213 A | 6/2005 |
| JP | 2009184138 A | 8/2009 |
| JP | 2013079469 A | 5/2013 |
| JP | 5331265 B1 | 10/2013 |
| JP | 2014009413 A | 1/2014 |
| JP | 2016064871 A | 4/2016 |
| JP | 2017124851 A | 7/2017 |
| JP | 6234654 B1 | 11/2017 |
| WO | 2013069788 A1 | 5/2013 |
| WO | 2017170462 A1 | 10/2017 |

OTHER PUBLICATIONS

English machine translation of JP 2002-203197 which is the text of published JP 2004-042959A, Feb. 12, 2004.*
Notification Concerning Transmittal of Copy of International Preliminary Report on Patentability (PCT/IB326) and Notification of Transmittal of Copies of Translation of the International Preliminary Report on Patentability (PCT/IB/338) dated Apr. 11, 2019, with International Preliminary Report on Patentability (PCT/IB/373) and Written Opinion of the International Searching Authority (PCT/ISA/237), for corresponding international application PCT/JP2017/035408, (13 pages).
International Search Report (ISR) dated Dec. 5, 2017, issued for International application No. PCT/JP2017/035408.
Extended European Search Report (EESR) dated Dec. 20, 2019, issued for European counterpart patent application No. EP17856415.9. (6 pages).

* cited by examiner

*Primary Examiner* — Michael C Miggins
(74) *Attorney, Agent, or Firm* — Law Office of Katsuhiro Arai

(57) ABSTRACT

An object is to provide a paper barrier material having excellent gas barrier property as well as excellent water vapor barrier property, wherein such paper barrier material is suitable for packaging applications such as food packaging materials, containers, and cups. The means for achieving the object is to provide a paper barrier material characterized in that it meets the conditions in (1) to (3) below: (1) the water vapor permeability at 40±0.5° C. in temperature and 90±2% in relative humidity is 3 g/m²·day or below; (2) the oxygen permeability at 23° C. in temperature and 0% in relative humidity is 3 ml/m²·day·atm or below; and (3) the oxygen permeability at 23° C. in temperature and 85% in relative humidity is 3 ml/m²·day·atm or below.

20 Claims, No Drawings

PAPER BARRIER MATERIAL

CROSS-REFERENCE TO RELATED APPLICATIONS

This application is the U.S. National Phase under 35 U.S.C. § 371 of International Application PCT/JP2017/035408, filed Sep. 29, 2017, which claims priority to Japanese Patent Application No. 2016-193098, filed Sep. 30, 2016, and No. 2016-196035, filed Oct. 3, 2016. The International Application was published under PCT Article 21(2) in a language other than English.

TECHNICAL FIELD

The present invention relates to a paper barrier material offering excellent gas barrier property as well as excellent water vapor barrier property, and specifically to a paper barrier material suitable for packaging applications such as food packaging materials, containers, and cups.

BACKGROUND ART

Adding gas barrier property (especially oxygen barrier property) to paper materials, or particularly paper packaging materials, is important in protecting the various packaged products from deterioration due to gas, such as oxidization caused by oxygen, for example.

Traditionally, a primary method for adding gas barrier property to a paper packaging material has been to extrusion-laminate over, or attach to, a paper base material (hereinafter also referred to as "base paper"), a gas barrier layer being a metal foil or metal deposition film constituted by aluminum or other metal, a polyvinyl alcohol or ethylene-vinyl alcohol copolymer, polyvinylidene chloride, polyacrylonitrile or other resin film, or a film coated with any such resin, or a ceramic deposition film on which silicon oxide, aluminum oxide, or other inorganic oxide has been deposited, and the like.

Other paper packaging materials to which gas barrier property has been added, which are publicly disclosed, include paper gas barrier materials having a gas barrier layer constituted by a water-soluble polymer and an inorganic layer-like compound (Patent Literature 1, Patent Literature 2), and a paper gas barrier material comprising a covered layer and a barrier layer constituted by a specific vinyl alcohol polymer (Patent Literature 2, Patent Literature 3).

Also, adding water resistance (especially water vapor barrier property) to paper packaging materials is important in protecting the various packaged products from deterioration due to water vapor.

A primary method for adding water vapor barrier property to a paper packaging material has been to extrusion-laminate over, or attach to, a paper base material, a resin film offering excellent water vapor barrier property, or a film coated with such resin offering excellent water vapor barrier property.

Paper packaging materials to which water vapor barrier property has been added by any other method, which are publicly disclosed, include a packaging paper having a moisture-proof layer constituted by synthetic resin latex, wax, or inorganic fine grains (Patent Literature 4).

Also, among paper packaging materials to which both gas barrier property and water vapor barrier property have been added, packaging materials comprising a paper base material laminated with a resin having gas barrier property and a resin having water vapor barrier property, are known.

BACKGROUND ART LITERATURE

Patent Literature

Patent Literature 1: Japanese Patent Laid-open No. 2009-184138
Patent Literature 2: Japanese Patent Laid-open No. 2003-094574
Patent Literature 3: Japanese Patent No. 5331265
Patent Literature 4: Japanese Patent Laid-open No. 2005-162213

SUMMARY OF THE INVENTION

Problems to be Solved by the Invention

However, packaging materials constituted by a paper base material (base paper) laminated with, or attached by, a resin having gas barrier property and a resin having water vapor barrier property limit the types of resin that can be used for lamination, etc., and thereby present a problem in that they cannot meet various quality requirements.

On the other hand, packaging materials constituted by a paper base material (base paper) to which gas barrier property and water vapor barrier property have been added by means of coating with resins having these properties, present fewer limitations in terms of which types of resin can be used, etc., and thus can meet various quality requirements. However, a packaging material to which both gas barrier property and water vapor barrier property have been added, such as a packaging material having gas barrier property according to Patent Literature 1 or Patent Literature 2 on which a moisture-proof layer according to Patent Literature 4 is provided, presents a problem in that, although good water vapor barrier property can be achieved, gas barrier property cannot be achieved. In addition, a moisture-proof paper having a water vapor barrier layer according to Patent Literature 4 on which a gas barrier layer according to Patent Literature 1 or Patent Literature 2 is provided, does not achieve sufficient gas barrier property and water vapor barrier property at the same time.

Accordingly, an object of the present invention is to provide a paper barrier material having excellent gas barrier property as well as excellent water vapor barrier property, or particularly a paper barrier material suitable for packaging applications such as food packaging materials, containers, and cups.

Means for Solving the Problems

The present invention provides [1] to [15] below.
[1] A paper barrier material characterized in that it meets the conditions in (1) to (3) below:
 (1) the water vapor permeability at 40±0.5° C. in temperature and 90±2% in relative humidity is 3 g/m$^2$·day or below;
 (2) the oxygen permeability at 23° C. in temperature and 0% in relative humidity is 3 ml/m$^2$·day·atm or below; and
 (3) the oxygen permeability at 23° C. in temperature and 85% in relative humidity is 3 ml/m$^2$·day·atm or below.
[2] The paper barrier material according to [1], characterized in that it is constituted by a paper barrier base paper that comprises a paper base material having a water vapor barrier layer as well as a gas barrier layer containing a water-soluble polymer, and a protective layer is further provided on at least one side of the paper barrier base paper.

[3] The paper barrier material according to [2], characterized in that the paper barrier base paper has the water vapor barrier layer and the gas barrier layer, in this order, on the paper base material.
[4] The paper barrier material according to [2] or [3], characterized in that the protective layer is a resin layer.
[5] The paper barrier material according to [4], characterized in that the resin layer is a resin laminate layer.
[6] The paper barrier material according to [5], characterized in that the resin laminate layer is an extrusion laminate layer.
[7] The paper barrier material according to [5], characterized in that the resin laminate layer is a film attachment layer.
[8] The paper barrier material according to [7], characterized in that the film attachment layer is a barrier film attachment layer.
[9] The paper barrier material according to [8], characterized in that the barrier film attachment layer is a deposition film attachment layer.
[10] The paper barrier material according to any one of [4] to [9], characterized in that the resin layer contains a bio-derived resin.
[11] The paper barrier material according to [10], characterized in that the bio-derived resin is a biodegradable resin.
[12] The paper barrier material according to [10], characterized in that the bio-derived resin is a non-biodegradable resin.
[13] The paper barrier material according to any one of [4] to [9], characterized in that the resin layer contains a resin derived from fossil resources.
[14] The paper barrier material according to [13], characterized in that the resin derived from fossil resources is a biodegradable resin.
[15] The paper barrier material according to [13], characterized in that the resin derived from fossil resources is a non-biodegradable resin.

Effects of the Invention

According to the present invention, a paper barrier material having excellent gas barrier property as well as excellent water vapor barrier property, or particularly a paper barrier packaging material having such properties, can be provided.

MODE FOR CARRYING OUT THE INVENTION

The present invention relates to a paper barrier material, or particularly a paper barrier packaging material, meeting the conditions in (1) to (3) below:

(1) The water vapor permeability at 40±0.5° C. in temperature and 90±2% in relative humidity is 3 g/m$^2$·day or below;
(2) The oxygen permeability at 23° C. in temperature and 0% in relative humidity is 3 ml/m$^2$·day·atm or below; and
(3) The oxygen permeability at 23° C. in temperature and 85% in relative humidity is 3 ml/m$^2$·day·atm or below.

The paper barrier material proposed by the present invention is constituted by a paper barrier base paper that comprises a paper base material having a water vapor barrier layer as well as a gas barrier layer containing a water-soluble polymer, and preferably a protective layer is further provided on at least one side of the paper barrier base paper, or more preferably a protective layer is provided on the side of the paper barrier base paper having the water vapor barrier layer and the gas barrier layer. In addition, preferably the paper barrier base paper has the water vapor barrier layer and the gas barrier layer, in this order, on the paper base material.

A paper barrier base paper that comprises a paper base material having a water vapor barrier layer as well as a gas barrier layer containing a water-soluble polymer, or particularly a paper barrier base paper having the water vapor barrier layer and the gas barrier layer in this order, exhibits excellent water vapor barrier property as well as excellent gas barrier property, presumably for the reasons described below.

As illustrated by example below, water-soluble polymers are generally used for gas barrier layers as resins having gas barrier property, and when a gas barrier layer and a water vapor barrier layer are provided on a paper base material in this order, the gas barrier layer containing a water-soluble polymer deteriorates easily due to moisture in the paper base material, and moisture in the air that permeates through the paper base material, and the like. On the other hand, when a water vapor barrier layer containing a resin having good water resistance, and a gas barrier layer, are provided on a paper base material in this order, the water vapor barrier layer can effectively suppress the gas barrier layer from being affected by (deteriorating due to) moisture in the paper base material, and the like. This is why a paper barrier base paper having a water vapor barrier layer and a gas barrier layer in this particular order exhibits good water vapor barrier property and gas barrier property.

(Paper Base Material)

Under the present invention, the paper base material is a sheet made of pulp, filler, and any of various auxiliary agents.

For the pulp, hardwood bleached kraft pulp (LBKP), softwood bleached kraft pulp (NBKP), hardwood unbleached kraft pulp (LUKP), softwood unbleached kraft pulp (NUKP), sulfite pulp or other chemical pulp, stone groundwood pulp, thermo-mechanical pulp or other mechanical pulp, de-inked pulp, recycled paper pulp or other wood fiber, non-wood fiber obtained from kenaf, bamboo, hemp, etc., may be used, among others, where two or more of the foregoing can be combined as deemed appropriate. Among these, use of chemical pulp or mechanical pulp made of wood fiber is preferred, and use of chemical pulp is more preferred, for reasons that include not allowing foreign matter to mix into the base paper easily, not allowing discoloration over time to occur easily in the products made with recycled paper containers that use the pulp, and having a high degree of whiteness which in turn achieves good surface texture when printed and thereby adds high value to the packaging materials using the pulp, in particular.

For the filler, white carbon, talc, kaolin, clay, heavy calcium carbonate, light calcium carbonate, titanium oxide, zeolite, synthetic resin filler, or any other known filler may be used. In addition, aluminum sulfate or any of various anionic, cationic, nonionic, or amphoteric retention aids, drainage aids, paper strengthening agents, internal sizing agents and other internal auxiliary agents used for papermaking may be used, as necessary. Furthermore, any dye, fluorescent whitening agent, pH-adjusting agent, antifoaming agent, pitch control agent, slime control agent, etc., may also be added, as necessary.

The method for manufacturing paper base material (papermaking method) is not limited in any way, and the paper base material may be manufactured according to the acidic papermaking, neutral papermaking, or alkaline papermaking method using any known Fourdrinier former, on-top hybrid former, gap former machine, etc. In addition, the paper base material may consist of one layer, or two or more layers.

Furthermore, the surface of the paper base material can be treated with various chemical agents. Examples of chemical agents that may be used include oxidized starch, hydroxy ethyl etherified starch, enzyme-modified starch, polyacrylamide, polyvinyl alcohol, surface sizing agent, water-resistant agent, water-retention agent, thickening agent, and lubricant, and the like. Any of the foregoing may be used alone, or two or more of them may be combined. Furthermore, any of these various chemical agents may be combined with a pigment or pigments. Examples of pigments include kaolin, clay, engineered kaolin, delaminated clay, heavy calcium carbonate, light calcium carbonate, mica, talc, titanium dioxide, barium sulfate, calcium sulfate, zinc oxide, silicate, silicate salt, colloidal silica, satin white, or other inorganic pigment, or solid, hollow, or core-shell type organic pigment, etc., which may be used alone, or two or more of them may be combined.

The method for treating the surface of the paper base material is not limited in any way, but any known coating machine such as a rod-metering size press, pond size press, gate-roll coater, spray coater, blade coater, curtain coater, etc., may be used.

For the paper base material obtained this way, various known types such as high-quality paper, medium-quality paper, coated paper, one-side glossy paper, kraft paper, one-side glossy kraft paper, bleached kraft paper, glassine paper, board paper, white board paper, liner, etc., can be given as examples.

Also, regarding the grammage of the paper base material, normally paper base materials whose grammage is approx. 20 g/m$^2$ or greater but no greater than 500 g/m$^2$ are preferred, although any grammage may be selected as deemed appropriate according to the various qualities, ease of handling, etc., desired of the paper barrier material. For paper barrier packaging materials used for packaging applications such as food packaging materials, containers, and cups, paper base materials whose grammage is 25 g/m$^2$ or greater but no greater than 400 g/m$^2$ are more preferred; particularly for paper barrier packaging materials used for soft packaging material applications that are explained below, paper base materials whose grammage is 30 g/m$^2$ or greater but no greater than 110 g/m$^2$ are more preferred.

(Water Vapor Barrier Layer)

Under the present invention, the water vapor barrier resin contained in the water vapor barrier layer may be a styrene-butadiene, styrene-acrylic, ethylene-vinyl acetate, paraffin (wax), butadiene-methyl methacrylate, vinyl acetate-butyl acrylate copolymer, or any of various other copolymers, maleic anhydride copolymer, acrylate-methyl methacrylate copolymer, or other synthetic adhesive, or any such synthetic adhesive containing paraffin (wax), which may be used alone, or two or more of them may be combined. Among these, a styrene-butadiene synthetic adhesive is preferred from the viewpoint of water vapor barrier property.

Under the present invention, a styrene-butadiene synthetic adhesive is produced by combining styrene and butadiene being the primary constituent monomers, with various types of comonomers for the purpose of modification, and then emulsifying and polymerizing the monomers. Examples of comonomers include methyl methacrylate, acrylonitrile, acrylamide, hydroxy ethyl acrylate, itaconic acid, maleic acid, acrylic acid, and other unsaturated carboxylic acids, and the like. Also, for the emulsifier, sodium oleiate, rosin acid soap, sodium alkyl allyl sulfonate, sodium dialkyl sulfosuccinate, or other anionic surface-active agent may be used alone or combined with a nonionic surface-active agent. Depending on the purpose, an amphoteric or cationic surface-active agent may also be used.

It should be noted that, so long as doing so does not present problems in terms of water vapor barrier property, completely saponified polyvinyl alcohol, partially saponified polyvinyl alcohol, ethylene copolymer polyvinyl alcohol, or other polyvinyl alcohol, casein, soybean protein, synthetic protein, or other protein, oxidized starch, cationized starch, urea phosphate esterified starch, hydroxy ethyl etherified starch, or other starch, carboxy methyl cellulose, hydroxy methyl cellulose, hydroxy ethyl cellulose, or other cellulose derivative, polyvinyl pyrrolidone, sodium alginate, or other water-soluble polymer may be combined with the aforementioned water vapor barrier resin.

Under the present invention constituted as having a water vapor barrier layer and a gas barrier layer, preferably a pigment is contained in the water vapor barrier layer from the viewpoint of adhesion between the water vapor barrier layer and the gas barrier layer.

For the pigment, kaolin, clay, engineered kaolin, delaminated clay, heavy calcium carbonate, light calcium carbonate, mica, talc, titanium dioxide, barium sulfate, calcium sulfate, zinc oxide, silicate, silicate salt, colloidal silica, satin white, or other inorganic pigment, or solid, hollow, or core-shell type organic pigment, etc., may be used alone, or two or more of them may be combined.

Among these, preferably an inorganic pigment such as flat-shaped kaolin, mica, or talc is used from the viewpoints of both improving the water vapor barrier property and reducing permeation into the gas barrier layer, where kaolin is more preferred. Also, preferably an inorganic pigment whose volume-median average grain size (D50) (hereinafter also referred to as "average grain size") is 5 μm or greater and whose aspect ratio is 10 or greater is used alone, or two or more such inorganic pigments are combined. If the average grain size or aspect ratio of the inorganic pigment used is smaller than the aforementioned range, the number of times the water vapor takes devious routes in the water vapor barrier layer decreases and thus its moving distance becomes shorter, which may consequently reduce the improvement effect of adding the pigment on the water vapor barrier property.

Under the present invention, preferably a pigment whose average grain size is 5 μm or smaller is further contained in the water vapor barrier layer that already contains an inorganic pigment whose average grain size is 5 μm or greater and whose aspect ratio is 10 or greater, from the viewpoints of improving the water vapor barrier property and adhesion with the gas barrier layer. By combining a pigment whose average grain size is 5 μm or smaller, the voids in the water vapor barrier layer that have been formed by the inorganic pigment whose average grain size is 5 μm or greater and whose aspect ratio is 10 or greater can be decreased in number, which helps express better water vapor barrier property. In other words, because pigments of different average grain sizes are contained in the water vapor barrier layer, the pigment of the smaller average grain size is filled in the voids that have been formed by the inorganic pigment of the greater average grain size in the water vapor barrier layer, and since the water vapor passes through by going around the pigment, presumably higher water vapor barrier property is demonstrated compared to a water vapor barrier layer that does not contain pigments of different average grain sizes.

Under the present invention, when an inorganic pigment whose average grain size is 5 μm or greater and whose aspect ratio is 10 or greater is combined with a pigment whose average grain size is 5 μm or smaller, preferably the blending ratio of the inorganic pigment whose average grain size is 5 μm or greater and whose aspect ratio is 10 or greater, and the pigment whose average grain size is 5 μm or smaller, is 50/50 to 99/1 in dry weight. If the blending ratio of the inorganic pigment whose average grain size is 5 μm or greater and whose aspect ratio is 10 or greater is smaller than the aforementioned range, the number of times the water vapor takes devious routes in the water vapor barrier layer decreases and thus its moving distance becomes shorter, which may consequently reduce the improvement effect of adding the pigment on the water vapor barrier property. If the blending ratio is greater than the aforementioned range, on the other hand, the voids that have been formed by the inorganic pigment of the greater average grain size in the water vapor barrier layer may not be sufficiently filled with the pigment whose average grain size is 5 μm or smaller, which eliminates any further improvement in the water vapor barrier property.

Under the present invention, the pigment whose average grain size is 5 μm or smaller, which is combined with the inorganic pigment whose average grain size is 5 μm or greater and whose aspect ratio is 10 or greater, is kaolin, clay, engineered kaolin, delaminated clay, heavy calcium carbonate, light calcium carbonate, talc, titanium dioxide, barium sulfate, calcium sulfate, zinc oxide, silicate, silicate salt, colloidal silica, satin white, or other inorganic pigment, or solid, hollow, or core-shell type organic pigment, etc., which may be used alone, or two or more of them may be combined. Among these pigments, use of heavy calcium carbonate is preferred.

When a pigment is contained in the water vapor barrier layer, the blending quantity of the pigment is such that the total quantity of the water vapor barrier resin and water-soluble polymer falls preferably in a range of 5 parts by weight or more but no more than 200 parts by weight, or more preferably in a range of 10 parts by weight or more but no more than 150 parts by weight, relative to 100 parts by weight of the pigment in dry weight.

Also, various auxiliary agents normally used, such as dispersant, thickening agent, water-retention agent, anti-foaming agent, water-resistant agent, dye, fluorescent dye, etc., may be used in the water vapor barrier layer, in addition to the aforementioned water vapor barrier resin, water-soluble polymer, and pigment.

Under the present invention, any of the crosslinking agents, representative examples of which include polyvalent metal salts, etc., may be added to the water vapor barrier layer. A crosslinking agent reacts and crosslinks with the water vapor barrier resin and water-soluble polymer contained in the water vapor barrier layer, to increase the number of bonds (crosslinked points) in the water vapor barrier layer. This means that the water vapor barrier layer becomes structurally denser, and thereby expresses good water vapor barrier property.

Under the present invention, the type of crosslinking agent is not limited in any way, and any polyvalent metal salt (compound in which copper, zinc, silver, iron, potassium, sodium, zirconium, aluminum, calcium, barium, magnesium, titanium, or other polyvalent metal is bonded with carbonate ion, sulfate ion, nitrate ion, phosphate ion, silicate ion, nitrogen oxide, boron oxide, or other ionic substance), amine compound, amide compound, aldehyde compound, hydroxy acid, etc., may be selected and used as deemed appropriate, according to the type of the water vapor barrier resin or water-soluble polymer contained in the water vapor barrier layer.

When a styrene-butadiene, styrene-acrylic, or other styrene-based water vapor barrier resin that expresses excellent water vapor barrier property is used, preferably polyvalent metal salt is used, or more preferably potassium alum is used, from the viewpoint of expression of crosslinking effect.

The blending quantity of the crosslinking agent is not limited in any way so long as the resulting coating color concentration and coating color viscosity fall within coatable ranges; however, the crosslinking agent is blended by preferably 1 part by weight or more but no more than 10 parts by weight, or more preferably 3 parts by weight or more but no more than 5 parts by weight, relative to 100 parts by weight of the pigment. If the crosslinking agent is blended by less than 1 part by weight, the effect of adding the crosslinking agent may not be achieved fully. If the crosslinking agent is blended by more than 10 parts by weight, on the other hand, the coating color viscosity rises significantly and coating may become difficult.

When a crosslinking agent is added to the coating color for water vapor barrier layer under the present invention, preferably the crosslinking agent is dissolved in a polar solvent such as ammonia and the mixture is added to the coating color. When a crosslinking agent is dissolved in a polar solvent, it bonds with the polar solvent, and therefore adding the mixture to the coating color does not cause the crosslinking agent to immediately react and crosslink with the water vapor barrier resin and water-soluble polymer, which helps reduce the thickening of the coating color. In this case, presumably when the coating color is coated onto the paper base material and then dried, the polar solvent component volatilizes and the crosslinking agent reacts and crosslinks with the water vapor barrier resin and water-soluble polymer, thereby forming a dense water vapor barrier layer.

Under the present invention, preferably a water repellent is contained in the water vapor barrier layer from the viewpoint of improving the water vapor barrier property. For the water repellent, examples include paraffin-based water repellents primarily constituted by alkane compound, carnauba, lanolin, and other water repellents based on animal or plant-based natural oil, silicone-containing water repellants that contain silicone or silicone compound, and fluorine-containing water repellants that contain fluorine compound, etc. Among these, use of a paraffin-based water repellant is preferred from the viewpoint of expression of water vapor barrier performance. Also, any one of these water repellents may be used alone, or two or more of them may be combined.

Under the present invention, the blending quantity of the water repellant is not limited in any way; however, preferably the water repellent is blended by 1 part by weight or more but no more than 100 parts by weight, relative to 100 parts by weight representing the total quantity of the water vapor barrier resin and water-soluble polymer in dry weight. If the water repellent is blended by less than 1 part by weight, the effect of improving the water vapor barrier property may not be achieved fully. If the water repellent is blended by more than 100 parts by weight, on the other hand, when a gas barrier layer is formed, it becomes difficult to form a gas barrier layer uniformly on top of the water vapor barrier layer, and consequently the gas barrier property may drop.

Also, under the present invention, the surface wetting tension of the water vapor barrier layer is preferably 10 mN/m or greater but no greater than 60 mN/m, or more preferably 15 mN/m or greater but no greater than 50 mN/m, in terms of improving the water vapor barrier property and adhesion with the gas barrier layer.

(Gas Barrier Layer)

Under the present invention, examples of the water-soluble polymer used for the gas barrier layer may be completely saponified polyvinyl alcohol, partially saponified polyvinyl alcohol, ethylene copolymer polyvinyl alcohol, or other polyvinyl alcohol, casein, soybean protein, synthetic protein, or other protein, oxidized starch, cationized starch, urea phosphate esterified starch, hydroxy ethyl etherified starch, or other starch, carboxy methyl cellulose, hydroxy methyl cellulose, hydroxy ethyl cellulose, or other cellulose derivative, polyvinyl pyrrolidone, sodium alginate, etc. Among these, polyvinyl alcohol or cellulose derivative is preferred, while polyvinyl alcohol is more preferred, from the viewpoint of gas barrier property.

Under the present invention, preferably a pigment is contained in the gas barrier layer from the viewpoint of improving the gas barrier property. For the pigment used in the gas barrier layer, kaolin, clay, engineered kaolin, delaminated clay, heavy calcium carbonate, light calcium carbonate, mica, talc, titanium dioxide, barium sulfate, calcium sulfate, zinc oxide, silicate, silicate salt, colloidal silica, satin white, or other inorganic pigment, or solid, hollow, or core-shell type organic pigment, etc., may be used alone, or two or more of them may be combined.

Among these, preferably an inorganic pigment is used from the viewpoint of gas barrier property, while more preferably an inorganic pigment whose average grain size is 3 μm or greater and whose aspect ratio is 10 or greater is used, while even more preferably an inorganic pigment whose average grain size is 5 μm or greater and whose aspect ratio is 30 or greater is used.

If a pigment is contained in the gas barrier layer, oxygen and other gases pass through by going around the pigment. Accordingly, such gas barrier layer exhibits excellent gas barrier property in very humid ambience compared to a gas barrier layer constituted by a water-soluble polymer in which no pigment is contained.

Under the present invention, preferably when a pigment is contained in the gas barrier layer, the blending ratio of the pigment and the water-soluble polymer is 1/100 to 1000/100 in dry weight. If the pigment ratio is outside the aforementioned range, its effect of improving the gas barrier property may decrease.

It should be noted that, when a pigment is blended in the water-soluble polymer under the present invention, preferably the pigment is made into a slurry and then added and mixed.

Under the present invention, any of the crosslinking agents, representative examples of which include polyvalent metal salts, etc., may be added to the gas barrier layer. A crosslinking agent reacts and crosslinks with the water-soluble polymer contained in the gas barrier layer, to increase the number of bonds (crosslinked points) in the gas barrier layer. This means that the gas barrier layer becomes structurally denser, and thereby expresses good gas barrier property.

Under the present invention, the type of crosslinking agent is not limited in any way, and any polyvalent metal salt (compound in which copper, zinc, silver, iron, potassium, sodium, zirconium, aluminum, calcium, barium, magnesium, titanium, or other polyvalent metal is bonded with carbonate ion, sulfate ion, nitrate ion, phosphate ion, silicate ion, nitrogen oxide, boron oxide, or other ionic substance), amine compound, amide compound, aldehyde compound, hydroxy acid, etc., may be selected and used as deemed appropriate, according to the type of the water-soluble polymer contained in the gas barrier layer. It should be noted that, from the viewpoint of expression of crosslinking effect, preferably polyvalent metal salt is used, or more preferably potassium alum is used.

The blending quantity of the crosslinking agent is not limited in any way so long as the resulting coating color concentration and coating color viscosity fall within the coatable ranges; however, the crosslinking agent is blended by preferably 1 part by weight or more but no more than 10 parts by weight, or more preferably 3 parts by weight or more but no more than 5 parts by weight, relative to 100 parts by weight of the pigment. If the crosslinking agent is blended by less than 1 part by weight, the effect of adding the crosslinking agent may not be achieved fully. If the crosslinking agent is blended by more than 10 parts by weight, on the other hand, the coating color viscosity rises significantly and coating may become difficult.

Under the present invention, preferably a surface-active agent is contained in the gas barrier layer from the viewpoint of adhesion with the water vapor barrier layer. The ionic property of the surface-active agent is not limited in any way, and a surface-active agent of any type, such as anionic surface-active agent, cationic surface-active agent, amphoteric surface-active agent, or nonionic surface-active agent, may be used alone, or surface-active agents of two or more types may be combined. Examples of specific types include silicone surface-active agent, fluorine surface-active agent, alcohol surface-active agent, acetylene surface-active agent that contains an acetylene group, acetylene diol surface-active agent that contains an acetylene group and two hydroxyl groups, alkyl sulfonate surface-active agent that contains an alkyl group and sulfonic acid, ester surface-active agent, amide surface-active agent, amine surface-active agent, alkyl ether surface-active agent, phenyl ether surface-active agent, sulfate ester surface-active agent, phenol surface-active agent, and the like. Among these, preferably acetylene diol surface-active agent is used as it results in a marked improvement of coating color leveling property. It should be noted that improved coating color-leveling property leads to improved uniformity of the gas barrier layer, and consequently to improved gas barrier property.

Under the present invention, the surface tension of the coating color for gas barrier layer is adjusted preferably to 10 mN/m or greater but no greater than 60 mN/m, or more preferably to 15 mN/m or greater but no greater than 50 mN/m, from the viewpoint of adhesion with the water vapor barrier layer.

In addition, preferably the surface tension of the coating color for gas barrier layer is ±20 mN/m relative to the surface wetting tension of the water vapor barrier layer, from the viewpoint of adhesion between the water vapor barrier layer and the gas barrier layer.

Under the present invention, various auxiliary agents normally used, such as dispersant, thickening agent, water-retention agent, antifoaming agent, water-resistant agent, dye, fluorescent dye, etc., may be used in the gas barrier layer, in addition to the aforementioned water-soluble polymer and pigment.

(Coating of Water Vapor Barrier Layer and Gas Barrier Layer)

Under the present invention, the method for coating the water vapor barrier layer and gas barrier layer is not limited in any way, and they may be coated using any known coating machine or coating system. For example, the coasting machine may be a blade coater, bar coater, roll coater, air knife coater, reverse roll coater, curtain coater, spray coater, size press coater, gate roll coater, etc. Also, the coating system may be water-based coating that uses water or other similar solvent, or solvent-based coating that uses an organic solvent or other similar solvent.

For the method to dry the water vapor barrier layer and gas barrier layer, a steam heater, gas heater, infrared heater, electric heater, hot air heater, microwave, cylinder dryer, or any other standard method is used, for example.

Under the present invention, the coating quantity of the water vapor barrier layer is preferably 3 g/m$^2$ or greater but no greater than 50 g/m$^2$, or more preferably 5 g/m$^2$ or greater but no greater than 40 g/m$^2$, or even more preferably 7 g/m$^2$ or greater but no greater than 30 g/m$^2$ in dry weight. If the coating quantity of the water vapor barrier layer is smaller than 3 g/m$^2$, covering the base paper fully with the coating solution becomes difficult and thus sufficient water vapor barrier property may not be achieved, or the gas barrier layer may permeate into the paper base material and consequently sufficient gas barrier property may not be achieved. If the coating quantity is greater than 50 g/m$^2$, on the other hand, the dry load during coating increases.

It should be noted that, under the present invention, the water vapor barrier layer may be constituted by one layer, or by two or more layers. When the water vapor barrier layer is constituted by two or more layers, preferably the total coating quantity of all water vapor barrier layers falls within the aforementioned range.

Under the present invention, preferably the coating quantity of the gas barrier layer is 0.2 g/m$^2$ or greater but no greater than 20 g/m$^2$ in dry weight. If the coating quantity of the gas barrier layer is smaller than 0.2 g/m$^2$, forming a uniform gas barrier layer becomes difficult and thus sufficient gas barrier property may not be achieved. If the coating quantity is greater than 20 g/m$^2$, on the other hand, the dry load during coating increases.

It should be noted that, under the present invention, the gas barrier layer may be constituted by one layer, or by two or more layers. When the gas barrier layer is constituted by two or more layers, preferably the total coating quantity of all gas barrier layers falls within the aforementioned range.

(Protective Layer)

Under the present invention, preferably the paper base material further has a protective layer on at least one side of the paper barrier base paper having the water vapor barrier layer as well as the gas barrier layer containing a water-soluble polymer. The protective layer can prevent the moisture in the air, etc., from affecting (deteriorating) the water vapor barrier layer and gas barrier layer of the paper barrier base paper, while also adding further water vapor barrier property and gas barrier property, or oil resistance, solvent resistance, heat resistance, abrasion resistance, impact resistance, lightfastness, etc., to the paper barrier base paper. If the protective layer is a resin layer, it can also add heat sealing property.

While it can be provided on both sides of the paper barrier base paper, preferably the protective layer is provided at least on the side having the water vapor barrier layer and the gas barrier layer. In addition, preferably the paper base material has the protective layer on the gas barrier layer of the paper barrier base paper which has the water vapor barrier layer and the gas barrier layer in this order, so as to prevent moisture in the air, etc., from affecting (deteriorating) the water vapor barrier layer and the gas barrier layer.

The protective layer may be a resin layer, paper layer, metal foil, etc., among which a resin layer is preferred.

(Resin Layer)

Resins that can be used for the resin layer include polyester, polyvinyl alcohol, polypropylene, polyethylene, polystyrene, polyethylene terephthalate, polybutylene terephthalate, polymethyl pentene, polyvinyl chloride, acrylonitrile butadiene styrene, acrylonitrile styrene, polymethyl methacrylate, polyvinyl vinylidene, polyamide (nylon), polyacetal, polycarbonate, and other resins derived from fossil resources, polylactic acid (PLA), esterified starch, cellulose acetate, polybutylene succinate (PBS), polybutylene succinate adipate (PBSA), biopolyethylene, biopolyethylene terephthalate, biopolyurethane, and other bio-derived resins.

It should be noted that bio-derived resins include substances derived from organic resources that can be reused as material, and are defined as polymers with a number average molecular weight (Mn) of 1,000 or greater which are obtained by a chemical or biological synthesis.

Also, among the resins derived from fossil resources and bio-derived resins, polylactic acid (PLA), esterified starch, cellulose acetate, polybutylene succinate (PBS), polybutylene succinate adipate (PBSA), and other biodegradable resins, as well as polyethylene, polypropylene, polyester, polyethylene terephthalate, polyamide (nylon), biopolyethylene, and other non-biodegradable resins, may be used.

It should be noted that biodegradable resins are resins having a property to get broken down to the molecular level by the workings of microorganisms, eventually returning to nature as carbon dioxide and water.

Under the present invention, preferably the resin layer is a resin laminate layer. The resin laminate layer may be an extrusion laminate layer, barrier film, deposition film or other film attachment layer.

If the resin laminate layer is an extrusion laminate layer, any of the various resins mentioned above is laminated by the extrusion lamination method, as a resin laminate layer, on at least one side of the paper barrier base paper. If the resin laminate layer is a film attachment layer, on the other hand, a film constituted by any of the various resins mentioned above is attached by the dry lamination method, sand lamination method, etc., as a resin laminate layer, on at least one side of the paper barrier base paper. While it can be provided on both sides of the paper barrier base paper, preferably the resin layer is provided at least on the side having the water vapor barrier layer and the gas barrier layer. In addition, preferably the paper base material has the resin layer on the gas barrier layer of the paper barrier base paper which has the water vapor barrier layer and the gas barrier layer in this order.

Under the present invention, films that can be used for the film attachment layer include those constituted by the various resins mentioned above. Among these films, a barrier film such as a film whose primary constituent is polyvinyl alcohol, ethylene-vinyl alcohol copolymer, polyvinylidene chloride, polyacrylonitrile, or other resin, film produced by coating polyvinyl alcohol or other resin on a film constituted by any of the various resins mentioned above, film produced by attaching a metal foil made of aluminum or any of various other metals to a film constituted by any of the various resins mentioned above, or deposition film produced by depositing aluminum or any of various other metals or silicon oxide, aluminum oxide, or other inorganic oxide on a film constituted by any of the various resins mentioned above, is preferred, and a deposition film is more preferred. One or more layers constituted by any of these films may be attached according to the purpose.

The paper barrier material proposed by the present invention may be used directly as the paper barrier material, or it may be layered with any of various resins, etc., or attached with any of various general-purpose films, barrier films, aluminum foils, etc., to provide a paper barrier packaging material used for packaging applications such as food packaging materials, containers and cups, or a laminate used for industrial materials, etc. Among these, the present invention is suitable as a paper barrier packaging material used for packaging applications such as food packaging materials, containers, and cups, and it is particularly suitable as a soft packaging material for food, etc. It should be noted that, structurally, a soft packaging material is a packaging material constituted by a very flexible material, and the term generally refers to a packaging material constituted only by paper, film, aluminum foil, or other thin, flexible material, or by two or more of such materials being attached together. Shape-wise, a soft packaging material is a bag or other packaging material that maintains a three-dimensional shape while a content is inside.

When the paper barrier material proposed by the present invention is used as a food packaging material, or particularly a soft packaging material, it can be laminated with a resin having heat sealing property so as to enhance the airtightness of the packaging material, protect the content from oxidization due to oxygen or deterioration due to, e.g., moisture, and the like, and extend the preservation period.

Also, when it is used as a laminate for industrial materials, etc., the paper barrier material proposed by the present invention can reduce intrusion of oxygen and moisture to prevent decay and deterioration, and it is also expected to demonstrate a flavor barrier property that prevents the smell of the solvent from leaking out, and the like.

EXAMPLES

The present invention is explained in detail below by citing examples; however, it goes without saying that the present invention is not limited to these examples. It should be noted that, unless otherwise specified, "part" and "%" in the examples refer to "part by weight" and "percent by weight," respectively. It should also be noted that the obtained paper barrier materials were tested based on the evaluation methods described below.

(Evaluation Method)

(1) Water vapor permeability (water vapor barrier property): Water vapor permeability was measured using a moisture permeability measuring machine (L80-4000 manufactured by Dr. Lyssy) at a temperature of 40±0.5° C. and relative humidity of 90±2%.

(2) Oxygen permeability (gas barrier property): Oxygen permeability was measured using the OX-TRAN2/21 manufactured by MOCON under a condition of 23° C.-0% RH (dry) as well as a condition of 23° C.-85% RH (very humid).

Example 1

(Preparation of Paper Base Material)

Hardwood bleached kraft pulp (LBKP) of 500 ml in Canadian standard freeness (CSF), and softwood bleached kraft pulp (NBKP) of 530 ml in CSF, were blended at a weight ratio of 80/20, to obtain a material pulp.

To the material pulp, polyacrylamide (PAM) of 2500000 in molecular weight was added by 0.1% per absolute dry pulp weight as a dry paper strengthening agent, alkyl ketene dimer (AKD) was added by 0.35% per absolute dry pulp weight as a sizing agent, polyamide epichlorohydrin (PAEH) resin was added by 0.15% per absolute dry pulp weight as a wet paper strengthening agent, and polyacrylamide (PAM) of 10000000 in molecular weight was added by 0.08% per absolute dry pulp weight as a retention aid, after which the mixture was put through a Duo-Former FM papermaking machine at a rate of 300 m/min, to obtain a paper of 59 g/m² in grammage.

Next, polyvinyl alcohol (PVA117 manufactured by Kuraray) that had been prepared to a solids content of 2% was coated to 1.0 g/m² in total on both sides of the obtained paper using a rod-metering size press, and then dried, to obtain a base paper of 60 g/m² in grammage. The obtained base paper was smoothed by a single pass on a chilled calendar at a speed of 300 min/m and line pressure of 50 kgf/cm.

(Preparation of Coating Solution A1 for Water Vapor Barrier Layer)

To engineered kaolin (Barrisurf HX, average grain size 9.0 μm, aspect ratio 80 to 100, manufactured by Imerys), polyacrylate soda was added (by 0.2% relative to the pigment) as a dispersant, after which the mixture was dispersed in a Serie mixer, to prepare a kaolin slurry of 60% in solids content. Styrene-acrylic copolymer emulsion (X-511-374E manufactured by Saiden Chemical Industry) was blended as a water vapor barrier resin into the obtained kaolin slurry by 100 parts (solids content) per 100 parts (solids content) of the pigment, to obtain Coating Solution A1 for water vapor barrier layer of 45% in solids content.

(Preparation of Coating Solution B1 for Gas Barrier Layer)

An aqueous solution of polyvinyl alcohol (PVA117 manufactured by Kuraray) was prepared to a solids content of 12%, to obtain Coating Solution B1 for gas barrier layer. It should be noted that the surface tension of Coating Solution B1 for gas barrier layer was 35 mN/m.

(Preparation of Paper Barrier Material)

Using a blade coater operating at a coating speed of 300 m/min, Coating Solution A1 for water vapor barrier layer was coated on one side of the obtained base paper to a coating quantity of 15 g/m² in dry weight, and then dried, after which Coating Solution B1 for gas barrier layer was coated on top on the same side, using a roll coater operating at a coating speed of 300 m/min, to a coating quantity of 5.0 g/m² in dry weight, to obtain a paper barrier base paper. It should be noted that the surface wetting tension of the water vapor barrier layer on this paper barrier base paper was 35 mN/m.

Furthermore, low-density polyethylene (LC602A manufactured by Japan Polyethylene) was laminated on both sides of the obtained paper barrier base paper, to a thickness of 30 μm, respectively, using the extrusion lamination method, to obtain a paper barrier material.

Example 2

(Preparation of Coating Solution A2 for Water Vapor Barrier Layer)

To engineered kaolin (Barrisurf HX, average grain size 9.0 μm, aspect ratio 80 to 100, manufactured by Imerys), polyacrylate soda was added (by 0.2% relative to the pigment) as a dispersant, after which the mixture was dispersed in a Serie mixer, to prepare a kaolin slurry of 60% in solids content. Styrene-acrylic copolymer emulsion (X-511-374E manufactured by Saiden Chemical Industry) was blended as a water vapor barrier resin into the obtained kaolin slurry by 100 parts (solids content), and paraffin water repellant (MYE-35G, wax-containing polyethylene emulsion, manufactured by Maruyoshi Chemical) was blended by 100 parts (solids content) per 100 parts (solids content) of the pigment, to obtain Coating Solution A2 for water vapor barrier layer of 45% in solids content.

A paper barrier material was obtained in the same manner as in Example 1, except that Coating Solution A2 for water vapor barrier layer was used instead of Coating Solution A1 for water vapor barrier layer. It should be noted that the surface wetting tension of the water vapor barrier layer on the paper barrier base paper was 40 mN/m.

Example 3

A paper barrier material was obtained in the same manner as in Example 2, except that the lamination of low-density polyethylene on the paper barrier base paper by the extrusion lamination method was changed to attaching a straight-chain low-density polyethylene film (LL-XMTN manufactured by Futamura Chemical) of 20 μm in thickness on the gas barrier layer by the dry lamination method, while also attaching a biaxially oriented polypropylene film (FOA manufactured by Futamura Chemical) of 20 μm in thickness on the base paper by the dry lamination method.

Example 4

(Preparation of Coating Solution B2 for Gas Barrier layer)

An aqueous solution of polyvinyl alcohol (PVA117 manufactured by Kuraray) was prepared to a solids content of 12%. Silicone surface-active agent (SN Wet 125 manufactured by San Nopco) was blended into the obtained aqueous solution of polyvinyl alcohol by 1 part (solids content) per 100 parts (solids content) of the polyvinyl alcohol, to obtain Coating Solution B2 for gas barrier layer. It should be noted that the surface tension of Coating Solution B2 for gas barrier layer was 30 mN/m.

A paper barrier material was obtained in the same manner as in Example 2, except that Coating Solution B2 for gas barrier layer was used instead of Coating Solution B1 for gas barrier layer.

Example 5

A paper barrier material was obtained in the same manner as in Example 4, except that a film (MY-15, aluminum deposition PET film, manufactured by Nakai Industrial) was attached, by the dry lamination method, on the gas barrier layer of the obtained paper barrier base paper.

Comparative Example 1

A paper barrier material was obtained in the same manner as in Example 2, except that the gas barrier layer and the water vapor barrier layer were provided on the paper base material in this order.

Comparative Example 2

A paper barrier material was obtained in the same manner as in Example 2, except that no water vapor barrier layer was provided.

Comparative Example 3

A paper barrier material was obtained in the same manner as in Example 2, except that no gas barrier layer was provided.

TABLE 1

|  | Coating quantity of water vapor barrier layer g/m$^2$ | Coating quantity of oxygen barrier layer g/m$^2$ | Water vapor permeability g/m$^2$ · day | Oxygen permeability (dry) m/m$^2$- · -day | Oxygen permeability (very humid) m/m$^2$- · -day |
|---|---|---|---|---|---|
| Example 1 | 15.0 | 5.0 | 1.5 | 0.4 | 0.8 |
| Example 2 | 15.0 | 5.0 | 1.0 | 0.5 | 0.7 |
| Example 3 | 15.0 | 5.0 | 0.5 | 0.5 | 0.5 |
| Example 4 | 15.0 | 5.0 | 1.0 | 0.4 | 0.6 |
| Example 5 | 15.0 | 5.0 | 0.3 | 0.3 | 0.3 |
| Comparative Example 1 | 15.0 | 5.0 | 1.0 | 10000 ↑ | 10000 ↑ |
| Comparative Example 2 | — | 5.0 | 10000 ↑ | 10000 ↑ | 10000 ↑ |
| Comparative Example 3 | 15.0 | — | 1.0 | 10000 ↑ | 10000 ↑ |

As shown in Table 1, the paper barrier materials in Examples 1 to 5 had excellent water vapor barrier property, as well as excellent gas barrier property under both dry and very humid conditions.

Example 6

(Preparation of Coating Solution A3 for Water Vapor Barrier Layer)

To engineered kaolin (Barrisurf HX, average grain size 9.0 μm, aspect ratio 80 to 100, manufactured by Imerys), polyacrylate soda was added (by 0.2% relative to the pigment) as a dispersant, after which the mixture was dispersed in a Serie mixer, to prepare a kaolin slurry of 55% in solids content. Styrene-butadiene latex (PNT7868 manufactured by Zeon Corporation) was blended as a water vapor barrier resin into the obtained kaolin slurry by 100 parts (solids content) per 100 parts (solids content) of the pigment, to obtain Coating Solution A3 for water vapor barrier layer of 50% in solids content.

(Preparation of Coating Solution B3 for Gas Barrier Layer)

To engineered kaolin (Barrisurf HX, average grain size 9.0 μm, aspect ratio 80 to 100, manufactured by Imerys), polyacrylate soda was added (by 0.2% relative to the pigment) as a dispersant, after which the mixture was dispersed in a Serie mixer, to prepare a kaolin slurry of 55% in solids content. An aqueous solution of polyvinyl alcohol (PVA117 manufactured by Kuraray) was prepared to a solids content of 10%, to obtain an aqueous solution of PVA. The obtained kaolin slurry and aqueous solution of PVA were mixed at a ratio of "pigment:aqueous solution of PVA=100:100," to a solids content of 10%, to obtain Coating Solution B3 for gas barrier layer.

(Preparation of Paper Barrier Material)

Using a blade coater operating at a coating speed of 300 m/min, Coating Solution A3 for water vapor barrier layer was coated on one side of a cup base paper (grammage: 270 g/m$^2$) to a coating quantity of 15 g/m$^2$ in dry weight, and then dried, after which Coating Solution B3 for gas barrier layer was coated on top on the same side, using an air-knife coater operating at a coating speed of 300 m/min, to a coating quantity of 2.0 g/m$^2$, to obtain a paper barrier base paper of 287 g/m$^2$ in grammage and 0.3 mm in paper thickness. A film (MY-15, aluminum deposition PET film, manufactured by Nakai Industrial) was attached, by the dry lamination method, on the gas barrier layer of the obtained paper barrier base paper, to obtain a paper barrier material.

Example 7

A paper barrier material was obtained in the same manner as in Example 6, except that the attaching film was changed from the aluminum deposition PET film (MY-15 manufactured by Nakai Industrial) to an alumina (ceramic) deposition PET film (GL-ARH-F manufactured by Toppan Printing).

Reference Example 1

A paper barrier material was obtained in the same manner as in Example 6, except that the attaching film was changed from the aluminum deposition PET film (MY-15 manufactured by Nakai Industrial) to an EVOH film (Eval Film EF-XL manufactured by Kuraray).

Example 8

A paper barrier material was obtained in the same manner as in Example 6, except that the paper base material was changed from the cup base paper (grammage: 270 g/m$^2$) to a single-side glossy kraft paper (grammage: 70 g/m$^2$).

Comparative Example 4

A paper barrier material was obtained in the same manner as in Example 6, except that the aluminum deposition PET film was not attached and the paper barrier base paper was used directly.

TABLE 2

|  | Coating quantity of water vapor barrier layer g/m$^2$ | Coating quantity of oxygen barrier layer g/m$^2$ | Water vapor permeability g/m$^2$ · day | Oxygen permeability (dry) m/m$^2$· · -day | Oxygen permeability (very humid) |
| --- | --- | --- | --- | --- | --- |
| Example 6 | 15.0 | 2.0 | 1.0 | 1.0 | 1.0 |
| Example 7 | 15.0 | 2.0 | 1.0 | 1.0 | 1.0 |
| Reference Example 1 | 15.0 | 2.0 | 5.0 | 1.0 | 3.0 |
| Example 8 | 15.0 | 2.0 | 1.0 | 1.0 | 1.0 |
| Comparative Example 4 | 15.0 | 5.0 | 200.0 | 1.0 | 80.0 |

As shown in Table 2, the paper barrier materials in Examples 6 to 8 had excellent water vapor barrier property, as well as gas (oxygen) barrier property under a very humid condition.

What is claimed is:

1. A paper barrier material characterized by meeting the conditions in (1) to (3) below:

(1) a water vapor permeability at 40±0.5° C. in temperature and 90±2% in relative humidity is 3 g/m$^2$·day or below;

(2) an oxygen permeability at 23° C. in temperature and 0% in relative humidity is 3 ml/m$^2$·day·atm or below; and (3) an oxygen permeability at 23° C. in temperature and 85% in relative humidity is 3 ml/m$^2$·day·atm or below, wherein the paper barrier material is constituted by a paper barrier base paper that comprises, as a sole base material, a paper base material having thereon a water vapor barrier layer as well as a gas barrier layer containing a water-soluble polymer, and a protective layer is further provided on at least one side of the paper barrier base paper, wherein the paper barrier base paper has the water vapor barrier layer and the gas barrier layer, in this order, on the paper base material.

2. The paper barrier material according to claim 1, wherein the water vapor barrier layer contains a water vapor barrier resin, said water vapor barrier resin includes one or more selected from (A) copolymers of a styrene-butadiene, styrene-acrylic, ethylene-vinyl acetate, paraffin (wax), butadiene-methyl methacrylate, or vinyl acetate-butyl acrylate, (B) synthetic adhesives of maleic anhydride copolymer, or acrylate-methyl methacrylate copolymer, and (C) said synthetic adhesives which further contain paraffin (wax).

3. The paper barrier material according to claim 1, characterized in that the protective layer is a resin layer.

4. The paper barrier material according to claim 3, characterized in that the resin layer contains a resin derived from fossil resources.

5. The paper barrier material according to claim 4, characterized in that the resin derived from fossil resources is a biodegradable resin.

6. The paper barrier material according to claim 4, characterized in that the resin derived from fossil resources is a non-biodegradable resin.

7. The paper barrier material according to claim 3, characterized in that the resin layer contains a bio-derived resin.

8. The paper barrier material according to claim 7, characterized in that the bio-derived resin is a biodegradable resin.

9. The paper barrier material according to claim 7, characterized in that the bio-derived resin is a non-biodegradable resin.

10. The paper barrier material according to claim 3, characterized in that the resin layer is a resin laminate layer.

11. The paper barrier material according to claim 10, characterized in that the resin laminate layer is an extrusion laminate layer.

12. The paper barrier material according to claim 11, characterized in that the resin layer contains a bio-derived resin.

13. The paper barrier material according to claim 11, characterized in that the resin layer contains a resin derived from fossil resources.

14. The paper barrier material according to claim 10, characterized in that the resin laminate layer is a film attachment layer.

15. The paper barrier material according to claim 14, characterized in that the resin layer contains a bio-derived resin.

16. The paper barrier material according to claim 14, characterized in that the resin layer contains a resin derived from fossil resources.

17. The paper barrier material according to claim 14, characterized in that the film attachment layer is a barrier film attachment layer.

18. The paper barrier material according to claim 17, characterized in that the barrier film attachment layer is a deposition film attachment layer.

19. The paper barrier material according to claim 10, characterized in that the resin layer contains a bio-derived resin.

20. The paper barrier material according to claim 10, characterized in that the resin layer contains a resin derived from fossil resources.

\* \* \* \* \*